Nov. 22, 1932.  F. STEIN  1,888,870

CIRCULAR SHEARS

Filed Oct. 16, 1931

Inventor:
Fritz Stein
By H. Lee Helms
Attorney

Patented Nov. 22, 1932

1,888,870

UNITED STATES PATENT OFFICE

FRITZ STEIN, OF BERLIN, GERMANY, ASSIGNOR OF ONE-HALF TO HERMANN EBELING, OF WILHELMINENHOFSTRASSE, BERLIN-OBERSCHONEWEIDE, GERMANY

CIRCULAR SHEARS

Application filed October 16, 1931, Serial No. 569,149, and in Germany October 17, 1930.

This invention relates to circular shears such as employed for the cutting of pasteboard or cardboard and employed by printers, boxmakers, etc.

The known machines of simple construction serve only for cutting the cardboard with introduction of the board to the knives or shears in direct fashion. In addition to these there is also a further type of machine, in which, beyond the mere cutting operation, provision is also made for simultaneously scoring and creasing the board. These, however, may be employed only for full size sheets or relatively wide strips, while in the case of narrow strips a proper guiding thereof is quite impossible owing to the excessive spacial disposal of the guide rolls and also the creasing and scoring rolls, which in part are subject to idle movement, so that a slanting cut will frequently result.

It is the object of the present invention to overcome the disadvantages referred to, and this is accomplished by the fact that the machine according to the invention is furnished with a displaceable table and with scoring and creasing means which may be removed from the path of movement of the said table. In this manner it is possible to perform all requisite operations in perfectly faultless manner.

The invention is illustrated in sectional view in the accompanying drawing, in which Fig. 1 shows a machine on which any desired form of cutting, scoring and creasing operation may be performed.

Owing to the fact that the table is displaceable and may be moved right up to the feed rollers for the following operation, any intermediate spacing between the single pairs of feed rolls is accordingly overbridged, so that even the narrowest strip of board entering into practical consideration will be guided in perfectly secure fashion without the addition of auxiliary means such as band guides or the like.

Figure 1:
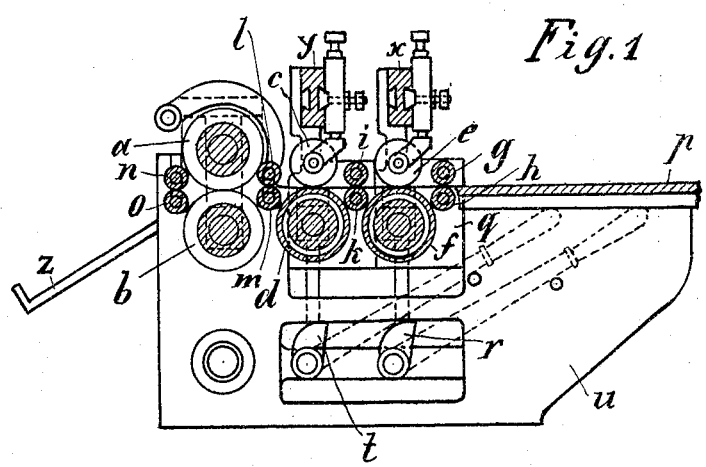
Figure 2:
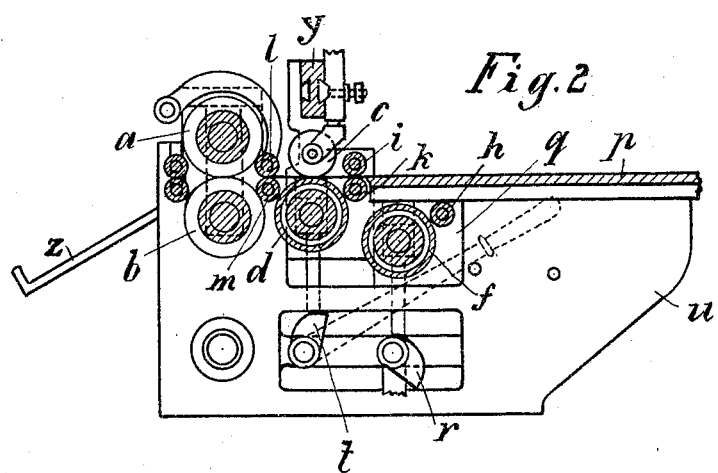
Fig. 2 shows a machine for cutting and scoring or creasing.

The machine is adapted for performing the three operations illustrated in the three figures in the following manner:

Fig. 1 shows a machine having the shears or knives $a$ and $b$, the creasing knife $c$ with base roller $d$, the scoring knife $e$ with base roller $f$, the feed rolls $g$ and $h$, $i$ and $k$, $l$ and $m$, and $n$ and $o$, the feed table $p$, and the depositing table $z$. The base roller $f$ and the appertaining lower feed or guide roll $h$ are mounted with their operating wheels in two common slides $q$, and may be lifted or lowered simultaneously in the two frame portions by means of the cams $r$ and a suitable hand lever, as readily disclosed by comparison between Figs. 1 and 2. In Fig. 2 the upper scoring knife beam $x$ together with the scoring knives $e$ and their holders and the upper feed or guide roll $g$ have been removed, and the table $p$ advanced as far as the feed rolls $i$, $k$. With this adjustment of the machine operations are performed merely with a creasing device, or as desired also with a scoring device. The sheets and strips, however, are in each case passed in direct fashion to the feed rolls $i$ and $k$, and accordingly do not require to traverse the space between $g$ and $i$ without means of support, so that the same maintain the position given to them upon introduction into the machine.

Figure 3:
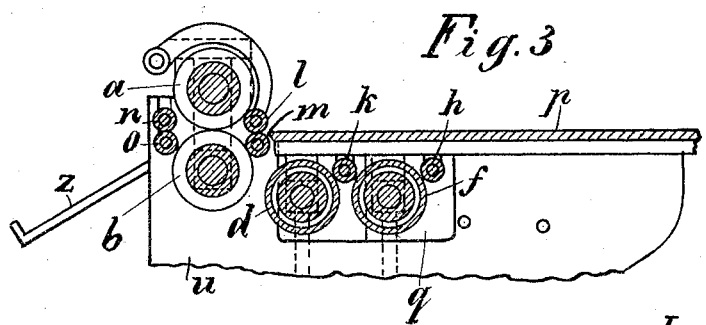
Fig. 3 shows a machine for cutting particularly narrow strips.

In exactly the same manner it is also possible to lower the base roller $d$ and lower guide roll $k$ together with the operating wheels by means of the cams $t$ and the hand lever, and to remove the knife beam $y$ with the creasing knives $c$ and feed roll $i$, so that the feed table may then be advanced up to the feed rolls for the actual cutting knives or shears, as shown in Fig. 3. In this adjustment of the machine the sheets or strips positioned on the table $p$ are passed to the cutting knives or shears in direct fashion, ensuring an angular cut.

In each of the three adjustments the machine is extremely simple to manipulate, and offers in its combination the same facilities as three separate machines constructed for each single operation.

It will be understood that no restriction is made to the specific form of embodiment shown, and that various modifications are quite possible within the meaning of the above description and the annexed claims without departing from the spirit of the invention.

What I claim as new and desire to secure by Letters Patent is:

1. A circular shears machine for creasing, scoring and cutting pasteboard, cardboard and the like, comprising in combination circular shears for the cutting operation, feed rolls for the said shears, scoring means, feed rolls for the said scoring means, creasing means, feed rolls for the said creasing means, and a displaceable feed table enabling the material to be fed in direct fashion to any of the said feed rolls as desired.

2. A circular shears machine for creasing, scoring and cutting pasteboard, cardboard and the like, comprising in combination circular shears for the cutting operation, feed rolls for the said shears, removable scoring means, feed rolls for the said scoring means, creasing means, feed rolls for the said creasing means, and a displaceable feed table enabling the material to be fed in direct fashion to any of the said feed rolls as desired.

3. A circular shears machine for creasing, scoring and cutting pasteboard, cardboard and the like, comprising in combination circular shears for the cutting operation, feed rolls for the said shears, scoring means, feed rolls for the said scoring means, removable creasing means, feed rolls for the said creasing means, and a displaceable feed table enabling the material to be fed in direct fashion to any of the said feed rolls as desired.

4. A circular shears machine for creasing, scoring and cutting pasteboard, cardboard and the like, comprising in combination circular shears for the cutting operation, feed rolls for the said shears, removable scoring means, removable feed rolls for the said scoring means, removable creasing means, removable feed rolls for the said creasing means, and a displaceable feed table, the arrangement being such that the said scoring means or said creasing means or both together with the appertaining feed rolls may be removed from the path of the said table to permit of the table being advanced up to the next feed rolls remaining.

In testimony whereof I affix my signature.
FRITZ STEIN.